US012105648B2

(12) United States Patent
Que et al.

(10) Patent No.: US 12,105,648 B2
(45) Date of Patent: Oct. 1, 2024

(54) DATA PROCESSING METHOD, APPARATUS, AND DEVICE

(71) Applicant: HUAWEI TECHNOLOGIES CO., LTD., Shenzhen (CN)

(72) Inventors: Mingjian Que, Hangzhou (CN); Ben Feng, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 17/513,043

(22) Filed: Oct. 28, 2021

(65) Prior Publication Data
US 2022/0050795 A1 Feb. 17, 2022

Related U.S. Application Data

(63) Continuation of application No. PCT/CN2020/075084, filed on Feb. 13, 2020.

(30) Foreign Application Priority Data

Apr. 30, 2019 (CN) .......................... 201910363976.8

(51) Int. Cl.
G06F 13/16 (2006.01)
G06F 9/455 (2018.01)
(52) U.S. Cl.
CPC ...... *G06F 13/1668* (2013.01); *G06F 9/45558* (2013.01); *G06F 2009/45583* (2013.01)
(58) Field of Classification Search
CPC .................................................. G11C 7/1072
See application file for complete search history.

(56) References Cited

U.S. PATENT DOCUMENTS 8,239,655 B2    8/2012  Goggin et al.
10,228,981 B2 * 3/2019  Kakaiya ............... G06F 9/4812
(Continued)

FOREIGN PATENT DOCUMENTS

CN    102591702 A    7/2012
CN    103389884 A    11/2013
(Continued)

OTHER PUBLICATIONS

Anonymous: "Memory-mapped I/O—Wikipedia", Mar. 22, 2019 (Mar. 22, 2019), pp. 1-5, XP055982927, Retrieved from the Internet: URL:https://en.wikipedia.org/w/index.php?title=Memory-mapped_I/Oandoldid=888922049.
(Continued)

*Primary Examiner* — Henry Tsai
*Assistant Examiner* — Juanito C Borromeo
(74) *Attorney, Agent, or Firm* — HAUPTMAN HAM, LLP

(57) ABSTRACT

A data processing method includes receiving, by a virtual machine, an I/O access request. The I/O access request is used to access data, the I/O access request includes a type of hardware data used to indicate a working status of a virtual I/O device, and the virtual I/O device is obtained after the I/O device is virtualized. The method also includes identifying, by the virtual machine, that the type of the hardware data in the I/O access request is first-type data. The first-type data is hardware data of the virtual I/O device that remains unchanged in a data processing process. The method further includes obtaining, by the virtual machine, to-be-accessed data from a first memory space. The first memory space is memory storage space in the data processing system.

20 Claims, 6 Drawing Sheets

(56) References Cited

U.S. PATENT DOCUMENTS

2008/0155167 A1* 6/2008 Mansell .................. G06F 13/24
 711/6
2020/0065127 A1* 2/2020 Kim .................... G06F 11/3476

FOREIGN PATENT DOCUMENTS

CN 104104705 A 10/2014
CN 104809124 A 7/2015

OTHER PUBLICATIONS

European Office Action issued in corresponding European Application No. 20798422.0, dated Nov. 24, 2022, pp. 1-5.
European Search Report issued in corresponding European Application No. 20798422.0, dated May 2, 2022, pp. 1-12.
International Search Report issued in corresponding International Application No. PCT/CN2020/075084, dated May 20, 2020, pp. 1-9.

* cited by examiner

DATA PROCESSING METHOD, APPARATUS, AND DEVICE

CROSS-REFERENCE TO RELATED APPLICATIONS

This application is a continuation of International Application No. PCT/CN2020/075084, filed on Feb. 13, 2020, which claims priority to Chinese Patent Application No. 201910363976.8, filed on Apr. 30, 2019. The disclosures of the aforementioned applications are hereby incorporated by reference in their entireties.

TECHNICAL FIELD

This application relates to the field of computer technologies, and in particular, to a data processing method, apparatus, and device in the virtualization field.

BACKGROUND

With rapid development of cloud computing technologies, various cloud platform infrastructures, for example, input/output (I/O) instances such as a storage device and a network device, are more widely used. A virtualization scenario is a major part of cloud computing and requires a large quantity of I/O devices. Most high-performance virtual I/O devices used by virtual machines are implemented based on a hardware-assisted virtualization technology. For example, a hardware device may be virtualized, by using a single root input/output virtualization (SR-IOV) technology, into a plurality of virtual devices for the virtual machine to use. In addition, when accessing the virtual device, the virtual machine may implement high performance of the I/O device without participation of a host machine.

SR-IOV is a hardware-assisted I/O virtualization solution and is one of hardware-assisted virtualization technologies, including a physical function (PF) and a virtual function (VF). The PF is a peripheral component interconnect express (PCIe) function that is supported by a PCIe device, and one PF can be expanded to a plurality of VFs. The VF is obtained through virtualizing by an I/O device supporting the SR-IOV. One VF corresponds to one virtual I/O device. The virtual machine uses the virtual I/O device through the VF. Each virtual I/O device correspondingly has independent I/O device storage space. The I/O device storage space is set in the I/O device, and is used to store hardware data that indicates a working status of the virtual I/O device. For example, hardware data of a virtual network interface card is stored in I/O device storage space corresponding to the virtual network interface card.

When an I/O device supporting the SR-IOV includes a plurality of virtual I/O devices, complete I/O device storage space is usually configured for each virtual I/O device, to store hardware data of the virtual I/O device. This increases overheads of hardware resources of the I/O device.

SUMMARY

This application provides a data processing method, apparatus, and device, to reduce overheads of hardware resources of an I/O device.

According to a first aspect, this application provides a data processing method, and the method relates to a data access processing process. The method is applied to a data processing system, and the data processing system includes a virtual machine and an input/output I/O device. The method includes: The virtual machine receives an I/O access request, where the I/O access request is used to access data, the I/O access request includes a type of hardware data used to indicate a working status of a virtual I/O device, and the virtual I/O device is an I/O device obtained after the I/O device is virtualized; and when identifying that the type of the hardware data in the I/O access request is first-type data, the virtual machine obtains to-be-accessed data from first memory space, where the first-type data is hardware data, of the virtual I/O device, that remains unchanged in a data processing process, and the first memory space is memory storage space in the data processing system.

In this application, the first-type data in the hardware data of the I/O device is stored in a memory of the data processing system. In comparison with an existing manner in which all hardware data of the virtual I/O device is stored in storage space of the I/O device, this application can greatly reduce storage space usage of the I/O device, and further reduce overheads of hardware of the I/O device. When the virtual machine accesses data and identifies that the type of the hardware data that the I/O access request requests to access is the first-type data, the virtual machine accesses data in the first memory space in the data processing system. In comparison with an existing manner in which the virtual machine accesses data in the storage space of the I/O device, a quantity of times the I/O device is accessed may be reduced, and a data access speed is further and effectively increased.

In a possible implementation, if the first-type data includes first data, the first data is hardware data that causes an additional operation of the I/O device when the virtual machine accesses the first data. The first memory space includes first sub-memory space, the first sub-memory space stores the first data and a processing function, and the processing function is used to simulate the additional operation corresponding to the first data. In this case, that the virtual machine obtains to-be-accessed data from first memory space includes: The virtual machine obtains the first data from the first sub-memory space, and enables a virtual machine monitor to invoke the processing function to simulate the additional operation corresponding to the first data, to control the I/O device to execute an action corresponding to the additional operation, where the data processing system includes the virtual machine monitor. In this application, the first data that is in the first-type data and that causes the additional operation of the I/O device when the virtual machine accesses the first data is stored in the first sub-memory space in the first memory space. This helps the virtual machine access the first data in the first sub-memory space. In addition, the processing function corresponding to the first data is stored in the first sub-memory space, so that when detecting that the virtual machine accesses the first data in the first sub-memory space, the virtual machine monitor may invoke the processing function to simulate the additional operation corresponding to the first data, to control the I/O device to execute the action corresponding to the additional operation. This ensures authenticity and effectiveness of accessing the first data by the virtual machine.

In another possible implementation, the first-type data further includes second data, the second data is hardware data other than the first data in the first-type data, the first memory space further includes second sub-memory space, and the second data is stored in the second sub-memory space. In this case, that the virtual machine obtains to-be-accessed data from first memory space includes: The virtual machine accesses the second data in the second sub-memory space. In this application, the virtual machine directly accesses the second data in the second sub-memory space instead of accessing the second data in the storage space of the I/O device. This reduces a quantity of times the I/O device is operated, and reduces overheads of hardware of the I/O device.

Optionally, there is a mapping relationship between a virtual address of the virtual machine and an address of the first memory space, and the virtual machine can directly access the first-type data in the first memory space based on the mapping relationship. This increases a speed of accessing the first-type data.

Further, the hardware data of the virtual I/O device in this application further includes second-type data, the second-type data is hardware data other than the first-type data in the hardware data of the virtual I/O device, and the second-type data is stored in the storage space of the I/O device. The storage space of the I/O device is set in the I/O device, and is storage space of the I/O device.

In this case, the method in this application further includes: When identifying that the type of the hardware data in the I/O access request is the second-type data, the virtual machine obtains the to-be-accessed data from the storage space of the I/O device. In this application, the second-type data is hardware data that changes in the data processing process of the virtual I/O device, and when the hardware data is accessed, the I/O device needs to immediately learn of the hardware data being accessed. Therefore, in this application, the second-type data is stored in the storage space of the I/O device. This helps the I/O device learn in time that the second-type data is accessed by the virtual machine, and immediately take a corresponding action, and further ensures data access timeliness.

Optionally, the virtual machine directly accesses the second-type data in the storage space of the I/O device. This further improves timeliness of accessing the second-type data.

According to a second aspect, this application provides a data processing method. The method relates to a data access process, the method is applied to a data processing system, and the data processing system includes a virtual machine monitor, a virtual machine, and an input/output I/O device. The method includes: The virtual machine monitor obtains first-type data, where the first-type data is hardware data, of a virtual I/O device, that remains unchanged in a data processing process, and the virtual I/O device is an I/O device obtained after the I/O device is virtualized; and the virtual machine monitor stores the first-type data in first memory space, where the first memory space is memory storage space in the data processing system.

In this application, the virtual machine monitor stores, in the first memory space of a server, the first-type data in the hardware data of the virtual I/O device. In comparison with an existing manner in which all hardware data of the virtual I/O device is stored in storage space of the I/O device, when the I/O device includes a large quantity of virtual I/O devices, the method according to this application can greatly reduce occupation of the storage space of the I/O device and overheads of hardware of the I/O device.

In a possible implementation, before that the virtual machine monitor stores the first-type data in first memory space, the method further includes: The virtual machine monitor applies for the first memory space in memory storage space in the data processing system based on a size of the first-type data. In this case, the first-type data may be stored in the first memory space.

In a possible implementation, the first-type data includes first data, the first data is hardware data that causes an additional operation of the I/O device when the virtual machine accesses the first data, and the method according to this application includes: The virtual machine monitor applies for first sub-memory space in the first memory space based on a size of the first data; and the virtual machine monitor stores the first data and a processing function in the first sub-memory space, where the processing function is used to simulate the additional operation corresponding to the first data. In this case, the first data is stored in the first sub-memory space in the first memory space. When accessing the first data, the virtual machine may directly access the first data in the first sub-memory space instead of accessing the first data in the storage space of the I/O device. This reduces a quantity of times the I/O device is operated, and reduces overheads of hardware of the I/O device. In addition, the processing function corresponding to the first data is stored in the first sub-memory space, so that when detecting that the virtual machine accesses the first data in the first sub-memory space, the virtual machine monitor may invoke the processing function to simulate the additional operation corresponding to the first data, to control the I/O device to execute the action corresponding to the additional operation. This ensures authenticity and effectiveness of accessing the first data by the virtual machine.

In this implementation, the method further includes: When detecting that the virtual machine accesses the first data in the first sub-memory space, the virtual machine monitor invokes the processing function to simulate the additional operation corresponding to the first data; and the virtual machine monitor controls the I/O device to execute an action corresponding to the additional operation. This further ensures authenticity and effectiveness of accessing the first data by the virtual machine.

In another possible implementation, the first-type data further includes second data, the second data is hardware data other than the first data in the first-type data, and the method further includes: The virtual machine monitor applies for second sub-memory space in the first memory space based on a size of the second data; and the virtual machine monitor stores the second data in the second sub-memory space. In this case, the second data may be stored in the second sub-memory space. When accessing the second data, the virtual machine may directly access the second data in the second sub-memory space instead of accessing the second data in the storage space of the I/O device. This reduces a quantity of times the I/O device is operated, and reduces overheads of hardware of the I/O device.

In another possible implementation, the method further includes: When detecting that the second data changes, the virtual machine monitor sends changed second data to the I/O device. In this case, when a protocol of the virtual I/O device is updated, and a new functional area or a vendor-specific register is added, a problem that it is inconvenient to add new data is resolved by changing or adding the second data in the second sub-memory space. When detecting that the second data in the second sub-memory space is changed, the virtual machine monitor sends changed second data to the I/O device, to ensure that a driver of the virtual machine works together with the I/O device normally.

Further, the hardware data of the virtual I/O device in this application further includes second-type data, the second-type data is hardware data other than the first-type data in the hardware data of the virtual I/O device, that is, hardware data that changes in the data processing process of the virtual I/O device, and the method further includes: The virtual machine monitor stores the second-type data in the storage space of the I/O device. In this application, the second data is hardware data that changes in the data processing process of the virtual I/O device, and when the hardware data is accessed, the I/O device needs to immediately learn of the hardware data being accessed. Therefore, in this application, the second-type data is stored in the storage space of the I/O device. This helps the I/O device learn in time that the second-type data is accessed by the virtual machine, and immediately take a corresponding action, and further ensures data access timeliness.

In a possible implementation, the method further includes: The virtual machine monitor maps an address of the second-type data in the storage space of the I/O device to an address of the second memory space, so that the virtual machine can access the second-type data in the storage space of the I/O device by accessing the second memory space.

In another possible implementation, the method further includes: The virtual machine monitor maps both an address of the first memory space and the address of the second memory space to virtual address space of the virtual machine, so that the virtual machine may access the second-type data in the storage space of the I/O device and access the first-type data in the first memory space by accessing the virtual address space of the virtual machine.

According to a third aspect, this application provides a data processing apparatus. The apparatus can implement a function of the virtual machine, the apparatus is applied to a data processing system, and the data processing system includes the apparatus and an input/output I/O device. The apparatus includes a receiving unit, a processing unit, and an obtaining unit. The receiving unit is configured to receive an I/O access request, where the I/O access request is used to access data, the I/O access request includes a type of hardware data used to indicate a working status of a virtual I/O device, and the virtual I/O device is an I/O device obtained after the I/O device is virtualized. The processing unit is configured to identify that the type of the hardware data in the I/O access request is first-type data, where the first-type data is hardware data, of the virtual I/O device, that remains unchanged in a data processing process. The obtaining unit is configured to obtain to-be-accessed data from first memory space, where the first memory space is memory storage space in the data processing system.

In a possible implementation, the first-type data includes first data, the first data is hardware data that causes an additional operation of the I/O device when the apparatus accesses the first data, the first memory space includes first sub-memory space, the first sub-memory space stores the first data and a processing function, and the processing function is used to simulate the additional operation corresponding to the first data. The obtaining unit is configured to obtain the first data from the first sub-memory space, and enable a virtual machine monitor to invoke the processing function to simulate the additional operation corresponding to the first data, to control the I/O device to execute an action corresponding to the additional operation, where the data processing system includes the virtual machine monitor.

In another possible implementation, the first-type data further includes second data, the second data is hardware data other than the first data in the first-type data, the first memory space further includes second sub-memory space, and the second data is stored in the second sub-memory space. The obtaining unit is configured to access the second data in the second sub-memory space.

Optionally, there is a mapping relationship between a virtual address of the apparatus and an address of the first memory space.

According to a fourth aspect, this application provides a data processing apparatus. The apparatus can implement a function of the virtual machine monitor, the apparatus is applied to a data processing system, and the data processing system includes the apparatus, a virtual machine, and an input/output I/O device. The apparatus includes an obtaining unit and a processing unit. The obtaining unit is configured to obtain first-type data, where the first-type data is hardware data, of a virtual I/O device, that remains unchanged in a data processing process, and the virtual I/O device is an I/O device obtained after the I/O device is virtualized. The processing unit is configured to store the first-type data in first memory space, where the first memory space is memory storage space in the data processing system.

In a possible implementation, the processing unit is further configured to apply for the first memory space in memory storage space in the data processing system based on a size of the first-type data.

In another possible implementation, the first-type data includes first data, and the first data is hardware data that causes an additional operation of the I/O device when the virtual machine accesses the first data. The processing unit is configured to apply for first sub-memory space in the first memory space based on a size of the first data, and store the first data and a processing function in the first sub-memory space, where the processing function is used to simulate the additional operation corresponding to the first data.

In another possible implementation, the processing unit is further configured to: when detecting that the virtual machine accesses the first data in the first sub-memory space, invoke the processing function to simulate the additional operation corresponding to the first data, and control the I/O device to execute an action corresponding to the additional operation.

In another possible implementation, the first-type data further includes second data, and the second data is hardware data other than the first data in the first-type data. The processing unit is configured to apply for the second sub-memory space in the first memory space based on a size of the second data, and store the second data in the second sub-memory space.

In another possible implementation, the apparatus further includes a sending unit. The processing unit is further configured to detect that the second data changes. The sending unit is configured to: when the processing unit detects that the second data changes, send changed second data to the I/O device.

In another possible implementation, the processing unit is further configured to store second-type data in storage space of the I/O device, where the second-type data is hardware data other than the first-type data in the hardware data of the virtual I/O device.

In another possible implementation, the processing unit is further configured to map an address of the second-type data in the storage space of the I/O device to an address of second memory space of the server.

In another possible implementation, the processing unit is further configured to map both an address of the first memory space and the address of the second memory space to virtual address space of the virtual machine.

According to a fifth aspect, this application provides a data processing device, including a processor. The processor is configured to perform the method in the first aspect or the second aspect.

According to a sixth aspect, this application provides a computer storage medium. The storage medium includes computer instructions, and when the instructions are executed by a computer, the computer is enabled to perform the method in the first aspect or the second aspect.

According to a seventh aspect, this application provides a computer program product, including a computer program. The computer program is stored in a readable storage medium, at least one processor of a data processing device may read the computer program from the readable storage medium, and the at least one processor executes the computer program, so that the data processing device performs the method in any one of the first aspect or the second aspect.

This application provides a data processing method, apparatus, and device. In a data storage process, a virtual machine monitor stores, in first memory space of a server, first-type data in hardware data of a virtual I/O device. In comparison with an existing manner in which all hardware data of the virtual I/O device is stored in storage space of an I/O device, when the I/O device includes a large quantity of virtual I/O devices, the method according to this application can greatly reduce occupation of the storage space of the I/O device and overheads of hardware of the I/O device. In a data access process, after receiving an I/O access request, a virtual machine identifies a type of hardware data that the I/O access request requests to access. When identifying that the type of the hardware data that the I/O access request requests to access is first-type data, the virtual machine accesses the data in the first memory space of the server. When identifying that the type of the hardware data that the I/O access request requests to access is second-type data, the virtual machine accesses the data in the storage space of the I/O device. A quantity of times of the I/O device is accessed may be reduced, and a data access speed is further and effectively increased.

DESCRIPTION OF EMBODIMENTS

The following describes technical solutions in embodiments of this application with reference to the accompanying drawings in the embodiments of this application.

To facilitate understanding of the embodiments of this application, related concepts in the embodiments of this application are first briefly described as follows.

A virtual machine monitor (VMM) is configured to manage a virtual machine. For example, the virtual machine monitor includes but is not limited to a hypervisor. A function of a virtual machine monitor may be implemented by using a quick emulator (QEMU), VMware (a type of virtual machine software), and VirtualBox (a type of virtual machine software).

Virtual function input/output (VFIO) is a set of user-mode driver frameworks, and provides, for a user mode, an interface for accessing a hardware device and for configuring a management device. A hypervisor may use the VFIO framework, to implement that a virtual machine directly uses a device that supports SR-IOV.

Memory-mapped input/output (MMIO) facilitates access to a central processing unit (CPU) by mapping a resource of a peripheral device to memory space of a host.

Virtualization input/output (Virtio) is a set of I/O virtualization frameworks for a paravirtualization platform. The Virtio abstracts general simulation devices in a hypervisor, and provides a group of standard interfaces for a virtual machine to access the simulation devices.

Single root input/output virtualization (SR-IOV) is a hardware-based virtualization solution that improves virtual machine performance and scalability. The SR-IOV creates a series of virtual functions (VF) for physical ports of I/O devices. One VF is configured on each virtual machine, one VF corresponds to one virtual I/O device, and a virtual machine loads a VF to load an I/O device corresponding to the VF. The SR-IOV allocates the I/O function to a plurality of virtual interfaces, so that a resource of an I/O device can be shared in a virtualization environment. By using the SR-IOV, the virtual machine may perform network transmission without participation of a software simulation layer. This reduces I/O overheads at the software simulation layer. After being created, the VF can be directly assigned to the virtual machine. The function enables different virtual machines to share one physical device and perform I/O without overheads of a CPU and virtual machine management program software. In this case, SR-IOV functions are integrated into the I/O device, and a single I/O device is virtualized into a plurality of VF interfaces. Each VF interface has an independent virtual I/O channel, and the virtual I/O channels share an I/O channel of the I/O device. Each virtual machine may occupy one or more VF interfaces. In this case, the virtual machine may directly access the VF interface of the virtual machine to load the virtual I/O device without coordination of a hypervisor. This greatly improves network I/O performance.

Figure 1:
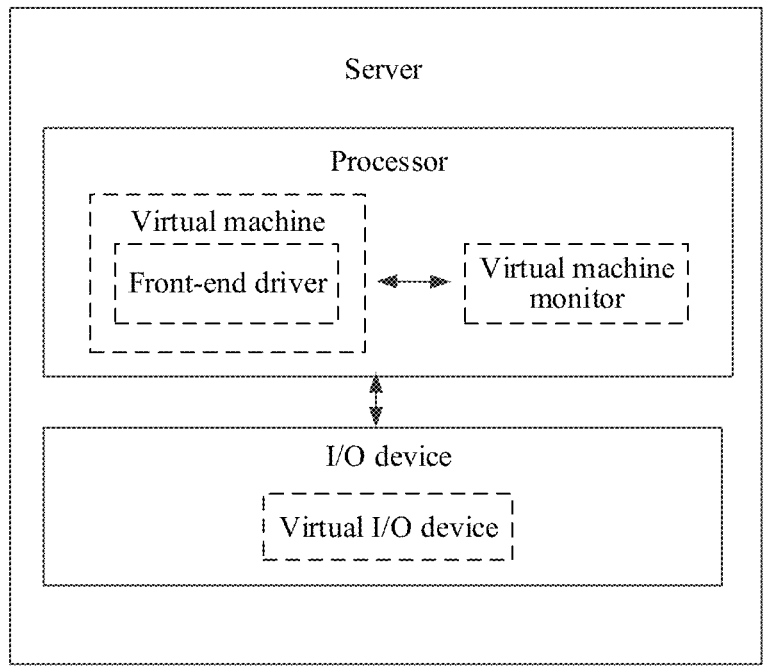
FIG. 1 is a schematic architectural diagram of a data processing system according to an embodiment of this application.

FIG. 1 is a schematic architectural diagram of a data processing system according to an embodiment of this application. As shown in FIG. 1, the data processing system includes a processor and an I/O device. For ease of description, the following provides description in detail by using an example in which the data processing system is a server.

The server is configured to run virtualization software, and virtualize a hardware resource of the server to generate one or more virtual machines. The server includes one or more processors, and each processor includes one or more processor cores. The server further includes a virtual machine monitor. For ease of description, the following provides description by using an example in which the processor in the server runs only one virtual machine monitor and one virtual machine.

The I/O device includes a device connected to the processor, such as a physical network interface card, a physical offload card, or a physical storage card. In a possible embodiment, the I/O device may access the server through a PCIe slot, to implement communication between the I/O device and the processor. Optionally, the foregoing I/O device may alternatively integrate with a server mainboard. The I/O device supports SR-IOV functions. The SR-IOV functions are integrated into the I/O device to virtualize a single I/O device into one or more virtual I/O devices. FIG. 1 shows, as an example, only a case in which the I/O device includes one virtual I/O device.

The virtual machine is a resource most common in a public cloud service environment. The virtual machine runs a virtual machine monitor program, such as a hypervisor program, on the server, to exert a virtualization capability provided by hardware such as a processor, and share a hardware resource with a plurality of operating systems that are running in parallel and logically isolated. The virtual machine may be understood as a client, may occupy one or more virtual I/O devices, and is configured to access the virtual I/O device according to an access instruction of a user. Each virtual machine includes a front-end driver. When accessing the virtual I/O device, the virtual machine loads the front-end driver. The front-end driver is configured to access hardware data of the virtual I/O device, to implement access to the virtual I/O device.

The virtual machine monitor is run on the processor, configured to manage the virtual machine and specify a virtual I/O device for the virtual machine. The virtual machine monitor may be implemented by software, that is, program code is run in the processor, to manage the virtual machine. The processor that runs the program may be the same as the processor that runs the virtual machine. For example, as shown in FIG. 1, the virtual machine and the virtual machine monitor are run on a same processor. Alternatively, different processors may be used to separately implement a function of the virtual machine monitor and a function of the virtual machine. For example, one processor implements the function of the virtual machine monitor, and another processor runs the virtual machine. Optionally, the virtual machine monitor may alternatively be implemented by hardware, that is, the function of the virtual machine monitor is implemented by using an independent processor or a logic circuit. For ease of description, the following provides description by using an example of a deployment form of the virtual machine and the virtual machine monitor shown in FIG. 1.

The hardware data of the virtual I/O device may be understood as data that enables the virtual I/O device to work normally, for example, attribute data and function data of the virtual I/O device.

The hardware data of the virtual I/O device meets a preset rule, for example, a preset I/O protocol. The following further describes this embodiment of this application by using an example in which the preset I/O protocol is the Virtio protocol. According to the Virtio protocol, a virtual I/O device complies with four standard capabilities: common configuration), notification), interrupt service routine (ISR), and device-specific. The common configuration capability is used to provide queue information configuration (such as a queue depth, a queue address, and queue enabling), device feature (that is, a feature supported by a device, for example, a format of a descriptor supported by the device) configuration, device status information, and the like. The notification capability is used to notify a device that I/O access is generated, when a host accesses the space. The notification capability is similar to a doorbell register in the non-volatile memory express (NVMe) protocol. The interrupt service routine capability: a device reports interrupt to a host CPU to notify the host that I/O processing is completed or an exception occurs. The device-specific capability: because the Virtio protocol supports various I/O devices, for example, a network interface card, a magnetic disk controller, and a graphics processing unit (GPU), space stores specific attribute of a corresponding device. The network interface card is used as an example. The network interface card stores information such as a quantity of network interface card queues, a value of a maximum transmission unit (MTU) that is supported, and a physical address (media access control or medium access control, MAC). To meet the foregoing four standard capabilities, the hardware data of the virtual I/O device includes specific hardware data described in the foregoing four standard capabilities. The hardware data corresponding to the common configuration includes fields related to a device function, a driver program function (driver_feature), and a queue. The hardware data corresponding to the notification includes a plurality of notification registers, and the notification register is associated with the queue. When the virtual machine initiates an I/O access request, a field in the notification register is changed to notify the I/O device that the I/O access request is generated. Therefore, the notification register plays an important role in an I/O process, and a slow processing speed of the notification registers affects timeliness of I/O access requests.

The server divides the hardware data of the virtual I/O device into first-type data and second-type data. A manner in which the server divides the hardware data into the first-type data and the second-type data is not limited in this embodiment of this application.

In a possible embodiment, the server divides the hardware data of the virtual I/O device into first-type data and second-type data based on whether the hardware data changes in a data processing process of the virtual I/O device.

The first-type data is hardware data, of a virtual I/O device, that remains unchanged in the data processing process. For example, the device function is used to identify a feature supported by the virtual I/O device, and a quantity of queues (num_queues) is used to identify a maximum quantity of queues supported by the virtual I/O device. All data is recorded as inherent information in a driver of the virtual I/O device only in an initialization phase of the virtual I/O device. The device function is used to indicate status information of the virtual I/O device, and changes only in the initialization or an offload phase of the driver of the virtual I/O device instead of an I/O access process. In this case, the device function), the driver program function, and the queue can take effect in the initialization phase of the virtual I/O device.

The second-type data is hardware data other than the first-type data in the hardware data of the virtual I/O device, or hardware data that changes in the data processing process of the virtual I/O device. For example, the notification register defined in space of the notification capability in the Virtio protocol is configured to notify the virtual I/O device when the front-end driver of the virtual machine initiates the I/O access request, so that the virtual I/O device immediately starts a direct memory access (DMA) engine to transmit data, and related data defined by space of the interrupt service routine capability is used to identify interrupt status information, so that the virtual machine directly accesses the data in the I/O device storage space to ensure timeliness.

Figure 2:
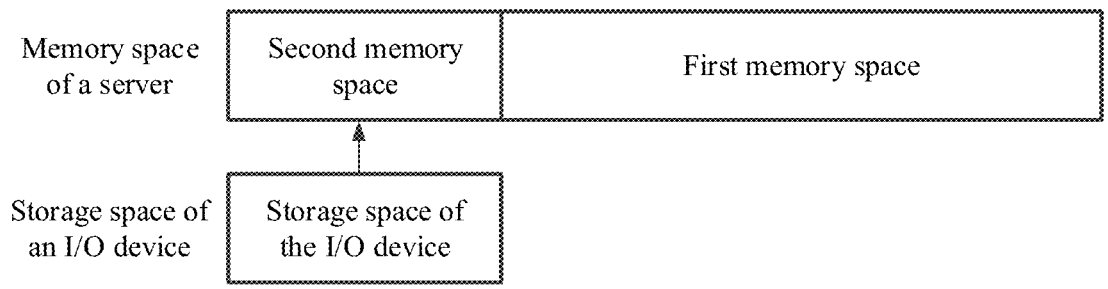
FIG. 2 is a schematic diagram of a configuration of hardware data according to an embodiment of this application.

FIG. 2 is a schematic diagram of a configuration of hardware data according to an embodiment of this application.

In a data configuration process, a virtual machine monitor is configured to apply for first memory space in a memory of a server for first-type data based on a size of the first-type data, and store the first-type data in the first memory space of the server. The virtual machine monitor is further configured to store second-type data in storage space of an I/O device, where the storage space of the I/O device may be understood as storage space that is of the I/O device and that may be accessed by a processor.

In a data access process, a virtual machine initiates an access request. If data that the I/O access request to accesses is the first-type data, the virtual machine accesses the data in the first memory space of the server. If data that the I/O access request accesses is the second-type data, the virtual machine accesses the data in the storage space of the I/O device.

Optionally, the I/O device further includes configuration space, and the configuration space includes one or more base address registers (base address register, BAR). One virtual I/O device in this embodiment of this application has I/O storage space, and there is a mapping relationship between the storage space of the I/O device and BAR space. In an actual data access process, once SR-IOV is enabled in a PF, BAR space of each virtual I/O device may be accessed by using a bus, a device, and a function number (a route ID) of the PF, and I/O device storage space of each virtual I/O device is further accessed based on the mapping relationship between the BAR space and the storage space of the I/O device.

Optionally, still referring to FIG. 2, subsequently, to help the server quickly access the second-type data stored in the storage space of the I/O device, the server is further configured to map an address of the second-type data in the storage space of the I/O device to an address of second memory space of the server, so that space that is in the second memory space of the server and that is mapped to the storage space of the I/O device may be understood as MMIO space. In this case, when the I/O access request of the virtual machine is a first address segment of the storage space of the I/O device, the second-type data may be accessed in the storage space of the I/O device based on the mapping relationship between an address of the MMIO space and the address of the storage space of the I/O device.

In this embodiment of this application, to help the virtual machine monitor store the first-type data, the first-type data is further divided into first data and second data. The first data is hardware data that causes an additional operation of the I/O device when the virtual machine accesses the first data, and the second data is hardware data that does not cause an additional operation of the I/O device when the virtual machine accesses the second data. For example, data related to a device function, a driver program function, and a queue is an inherent attribute of a front-end driver of the virtual machine. After the front-end driver reads the data, no subsequent additional action is executed. Therefore, the data is denoted as the second data. A device_status field in common configuration indicates status information of a device. The front-end driver can write the device_status field. For example, the Virtio protocol defines that when the front-end driver writes 0 to the device_status field, the I/O device needs to execute a corresponding I/O device reset action, including an additional operation such as clearing historical configuration information or clearing a queue cache. The data is denoted as the first data.

Figure 3:
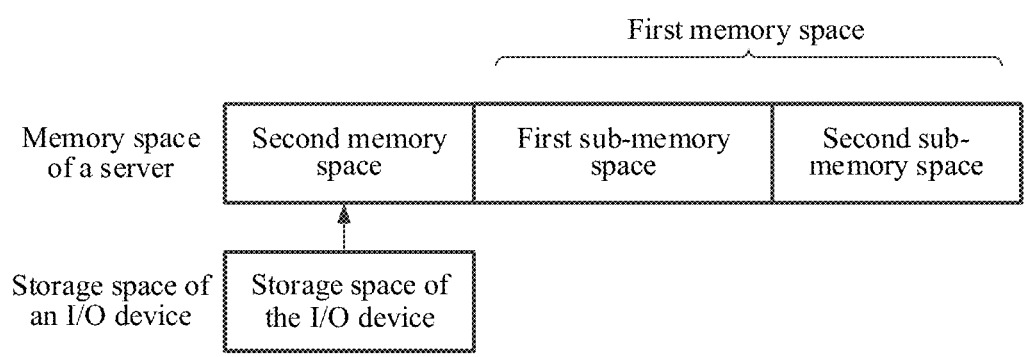
FIG. 3 is a schematic diagram of another configuration of hardware data according to an embodiment of this application.

Based on FIG. 1, FIG. 3 is a schematic diagram of another configuration of hardware data according to an embodiment of this application. First memory space of a server includes first sub-memory space and second sub-memory space.

In a data configuration process, a virtual machine monitor is configured to: apply for the first sub-memory space for first data based on a size of the first data, store the first data in the first sub-memory space, and configure a processing function for the first data, where the processing function is used to simulate an additional operation corresponding to the first data. The virtual machine monitor is further configured to apply for the second sub-memory space for second data based on a size of the second data, and store the second data in the second sub-memory space. The processing function may be understood as program code in the virtual machine monitor or a software module or a unit that implements the foregoing configuration function.

In a data access process, a virtual machine receives an I/O access request. If data that the I/O access request accesses is the first data, because the first data causes the additional operation of an I/O device, the virtual machine monitor intercepts the I/O access request, invokes the processing function corresponding to the first data, and simulates, by using the processing function, the additional operation corresponding to the first data. In addition, the I/O device is controlled to complete an action corresponding to the additional operation, for example, a reset action. If data that the I/O access request accesses is the second data, the virtual machine directly accesses the data in the second sub-memory of the server.

The following describes a data processing method according to an embodiment of this application with reference to FIG. 1 to FIG. 3.

Figure 4:
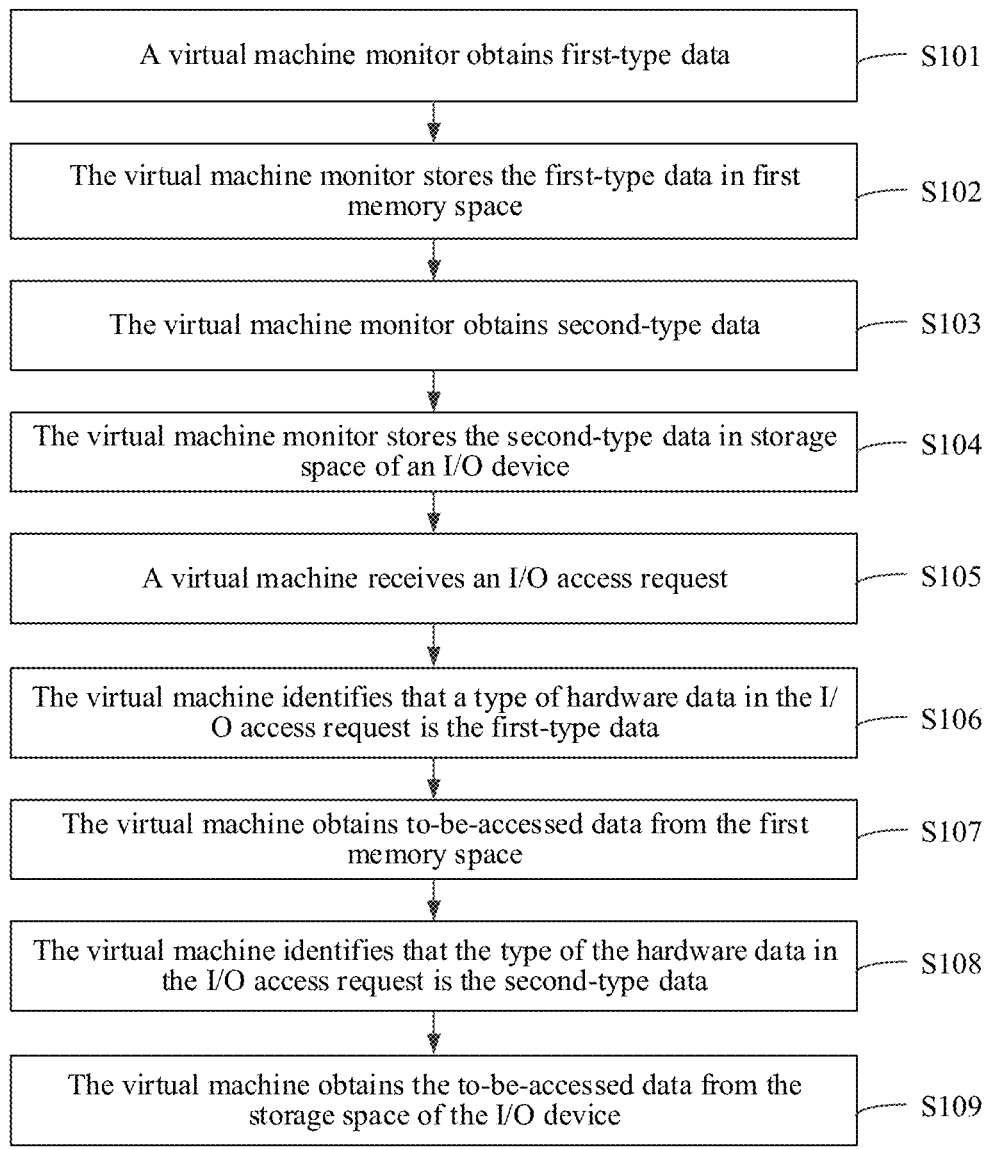
FIG. 4 is a flowchart of a data processing method according to an embodiment of this application.

FIG. 4 is a flowchart of a data processing method according to an embodiment of this application. A data processing process in this embodiment of this application includes a data storage process and a data access process. The data storage process is performed by a virtual machine monitor in a processor, and the data access process is performed by a virtual machine in the processor. The method may include the following steps.

S101: The virtual machine monitor obtains first-type data.

The first-type data is hardware data used to indicate a working status of a virtual I/O device, where the virtual I/O device is obtained after the I/O device is virtualized.

A type of the hardware data of the virtual I/O device may be determined according to a preset rule, for example, the type of the hardware data is determined according to the I/O protocol. When the virtual I/O device uses different I/O protocols, corresponding hardware data may be different. For example, hardware data corresponding to the NVMe protocol is different from hardware data corresponding to the Virtio protocol. The virtual I/O device is designed according to a preset rule, and is presented to a server in a form of a controller, for example, an NVMe controller or a Virtio controller. In this case, the virtual machine monitor may obtain the hardware data of the virtual I/O device according to the preset rule followed by the virtual I/O device, and distinguish the first-type data and second-type data from the hardware data of the virtual I/O device according to the preset rule. For an example process, refer to the description in FIG. 2. Details are not described herein again.

In a possible embodiment, hardware data, of the virtual I/O device, that remains unchanged in the data processing process is determined as first-type data, for example, reset/ initialization configuration/information negotiation data.

Hardware data, of the virtual I/O device, that changes in the data processing process is determined as second-type data, for example, data of a status of the virtual I/O device.

Optionally, the hardware data of the virtual I/O device may be hardware data of the I/O device, that is, the virtual I/O device reuses the hardware data of the I/O device.

S102: The virtual machine monitor stores the first-type data in first memory space.

The first memory space is memory storage space in the server.

After obtaining the first-type data of the virtual I/O device, the virtual machine monitor applies for the first memory space in memory space of the server for the first-type data and stores the first-type data in the first memory space of the server.

In a possible implementation, step S102 may include: The virtual machine monitor applies for the first memory space in the memory space of the server based on the size of the first-type data, and stores the first-type data in the first memory space.

Optionally, a size of the first memory space may be greater than or equal to the size of the first-type data. A size of the first memory space may alternatively be a first value. The first value is a value obtained through calculation based on a statistical value of a size of the first-type data that has been processed by the system. Alternatively, the size of the first memory space may be directly set to a second value, and the second value may be a default value. When an I/O access request is actually processed, dynamic capacity expansion is performed based on the current size of the first-type data, and a size of first memory space after the capacity expansion is greater than or equal to the size of the first-type data.

The first memory space that the virtual machine monitor applies for in the memory space of the server is memory space that does not store data. The virtual machine monitor stores the first-type data in the first memory space according to the preset rule of the virtual I/O device. For example, data in the first-type data is stored in space corresponding to a field a to a field b in the first memory space, and other data is stored in a same manner, so that the first-type data is stored in the first memory space.

The first memory space may be continuous storage space of a preset size in the memory, or may be storage space including a plurality of discontinuous storage area functions.

In a possible embodiment, this embodiment of this application further includes steps S103 and S104.

S103: The virtual machine monitor obtains the second-type data.

S104: The virtual machine monitor stores the second-type data in storage space of the I/O device.

The virtual machine monitor obtains the second-type data of the virtual I/O device, and stores the second-type data in the storage space of the I/O device, where the storage space of the I/O device is storage space that is of the I/O device and that may be accessed by the processor. In this case, when accessing the second-type data, the virtual machine directly accesses the storage space of the I/O device, and the I/O device learns in time that the second-type data is accessed, and immediately takes a corresponding action, to ensure data access timeliness.

According to the method in this embodiment of this application, the first-type data of the virtual I/O device is stored in the first memory space of the server. In comparison with an existing manner in which all hardware data of the virtual I/O device is stored in the storage space of the I/O device, the method greatly reduces occupation of the storage space of the I/O device. The second-type data of the virtual I/O device is stored in the storage space of the I/O device. Because the second-type data is hardware data, of the virtual I/O device, that changes in the data processing process, in this application, the second-type data is stored in the storage space of the I/O device. Therefore, when the second-type data is accessed, the I/O device can learn in time, and immediately take a corresponding action. This ensures data access timeliness.

The following describes the foregoing data storage process by using an example in which the virtual machine monitor is a QEMU.

Two parameters are newly added to the QEMU: a first parameter and a second parameter. The first parameter is used to identify that the virtual I/O device supports configuration of the hardware data in the memory space of the server, and the second parameter is used to identify the processing function required for simulating the additional function. The QEMU allocates, based on a feature of the virtual I/O device, the two parameters to the virtual I/O device that supports storage of the first-type data in the first memory space of the server.

In a data configuration process, the QEMU first starts the virtual machine, specifies a virtual I/O device for the virtual machine, and determines whether the virtual I/O device has the first parameter and the second parameter. If the virtual I/O device has the two parameters, the QEMU configures the hardware data for the virtual I/O device in a manner of the foregoing steps S101 to S103. The QEMU obtains the hardware data, and divides the hardware data into the first-type data and the second-type data. The QEMU applies for the first memory space in the server and stores the first-type data in the first memory space. The QEMU stores the second-type data in the storage space of the I/O device, to further implement configuration of the hardware data of the virtual I/O device.

According to the method in this embodiment of this application, a part of the hardware data of the virtual I/O device, namely, the first-type data, is stored in the first memory space of the server. In comparison with the existing manner in which all hardware data of the virtual I/O device is stored in the storage space of the I/O device, the method reduces occupation of the storage space of the I/O device. In the data processing process, the virtual machine monitor may directly read the first-type data from the memory of the server in an MMIO manner. This reduces message exchange between the virtual machine monitor and the I/O device. In addition, because the virtual machine monitor is deployed in the processor of the server, the processor may directly access the data in the memory, so that the virtual machine monitor can read the first-type data more quickly. This reduces duration of processing the I/O access request, and improves efficiency of processing the I/O access request.

In a possible embodiment, to help the virtual machine access the hardware data of the virtual I/O device, in the data storage process in this embodiment of this application, the method further includes the following steps.

S1041: The virtual machine monitor maps an address of the second-type data in the storage space of the I/O device to an address of second memory space of the server.

S1041 may be performed after S104.

Figure 5:
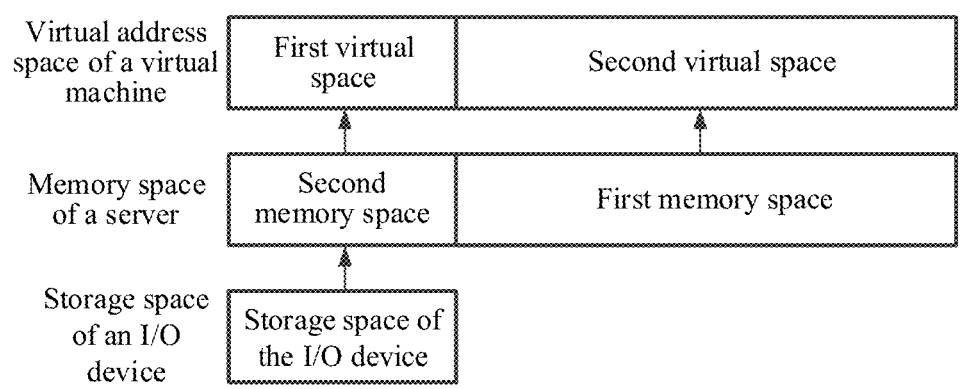
FIG. 5 is a schematic diagram of address mapping according to an embodiment of this application.

As shown in FIG. 5, to help the virtual machine access the second-type data, the address of the second-type data in the storage space of the I/O device is mapped to the address of the second memory space of the server. In this case, the virtual machine monitor may access the second-type data in the storage space of the I/O device by accessing the address of the second memory space.

S1042: The virtual machine monitor maps both an address of the first memory space and the address of the second memory space to virtual address space of the virtual machine.

As shown in FIG. 5, it is assumed that the virtual address space of the virtual machine is divided into two parts, denoted as first virtual address space and second virtual address space. The virtual machine monitor maps the address of the second memory space to the first virtual address space of the virtual machine, and maps the address of the first memory space to the second virtual address space of the virtual machine.

In this case, in the data access process, because of a mapping relationship between the address of the first memory space and the first virtual address space and a mapping relationship between the address of the second memory space and the second virtual address space, when the virtual machine directly accesses the virtual address space that can be accessed by the virtual machine, the virtual machine can directly access the data.

For example, when accessing the first-type data, the virtual machine accesses the second virtual address space. Because there is the mapping relationship between the second virtual address space and the address of the first memory space, the virtual machine may directly access the first-type data in the first memory space.

For another example, when accessing the second-type data, the virtual machine directly accesses the first virtual address space. Because there is the mapping relationship between the first virtual address space and the address of the second memory space and there is a mapping relationship between the address of the second memory space and the address of the storage space of the I/O device, the virtual machine may directly access the second-type data in the storage space of the I/O device.

Based on S1041 and S1042, in a possible embodiment, S104 may be replaced with S1043.

S1043: The virtual machine monitor directly stores the second-type data in the storage space of the I/O device.

In this step, to improve a speed of accessing the second-type data by the virtual machine, the virtual machine monitor directly configures the second-type data in the storage space of the I/O device in the direct mode. This ensures that when accessing the second-type data, the virtual machine directly accesses the second-type data in the storage space of the I/O device, to improve the speed of accessing the second-type data.

A direct mode used by the virtual machine monitor is not limited in this step. For example, the direct mode used in this step may be VFIO, where the VFIO is a set of user-mode device driver frameworks, including a VFIO interface layer, an I/O memory unit (IOMMU) driver, a VFIO-IOMMU abstraction layer, a VFIO-PCI abstraction layer, and a PCI bus driver.

The IOMMU is a module integrated on the processor, is configured to establish a function for the I/O device, for example, memory address mapping, controlling address isolation between devices, or interrupting remapping, and is a core hardware unit for directly using of the I/O device. The IOMMU implements DMA address mapping and interrupt mapping of the I/O device.

The VFIO framework encapsulates the IOMMU module and a PCIe module to provide a user-mode program with a set of standard interfaces that use the IOMMU and the I/O device.

The VFIO encapsulates the IOMMU driver to provide a user mode with a capability of managing an IOMMU page table. The IOMMU page table is used to record a mapping relationship between the I/O device and a memory address of the server, and each I/O device has a different IOMMU page table. The VFIO also encapsulates the I/O device driver to provide the user mode with an interface for directly accessing and configuring a management device. When the I/O device directly uses the VFIO, the user-mode hypervisor program can invoke various capabilities provided by the VFIO through a specified ioctl interface.

In some embodiments, a configuration process includes: The virtual machine monitor queries the storage space of the I/O device for configuring the second-type data, where the storage space may include a plurality of registers defined by the I/O protocol, configured to record the second-type data; the virtual machine monitor maps the address of the second-type data in the storage space of the I/O device to the address of the second memory space of the server; and the virtual machine monitor maps the address of the second memory space of the server to the virtual address space of the virtual machine, associates DMA of the I/O device and an interrupt resource through the IOMMU, and registers related data with the virtual machine, to implement a direct function of the I/O device.

In the data access process, if the type of the hardware data is the second-type data, the virtual machine directly accesses the data in the storage space of the I/O device in the direct mode. Because there is the mapping relationship between the first virtual address space and the address of the second memory space and there is the mapping relationship between the address of the second memory space and the address of the storage space of the I/O device, when accessing the first virtual address space, the virtual machine may directly access the second-type data in the storage space of the I/O device. This ensures timeliness of accessing the second-type data.

Based on the foregoing process of storing data by the virtual machine monitor described in S101 to S104, the following further describes the process of accessing data by the virtual machine with reference to steps S105 to S109.

S105: The virtual machine receives the I/O access request.

The I/O access request is used to access data, and the I/O access request includes a type of the hardware data used to indicate the working status of the virtual I/O device.

The type of the hardware data in the I/O access request may be first-type data, or may be second-type data.

S106: The virtual machine identifies that the type of the hardware data in the I/O access request is the first-type data.

S107: The virtual machine obtains to-be-accessed data from the first memory space.

After receiving the I/O access request, the virtual machine identifies the I/O access request. If the type of the hardware data in the I/O access request is the first-type data, the virtual machine accesses the first-type data in the first memory space of the server.

For example, the I/O access request is a read request. After receiving the read request, the virtual machine identifies whether the type of the hardware data requested in the read request is first-type data or second-type data. If the type of the hardware data is the first-type data, the virtual machine reads the first-type data from the first memory space of the server. If the type of the hardware data is the second-type data, the virtual machine reads the second-type data from the storage space of the I/O device.

S108: The virtual machine identifies that the type of the hardware data in the I/O access request is the second-type data.

S109: The virtual machine obtains the to-be-accessed data from the storage space of the I/O device.

If the virtual machine identifies that the type of the hardware data in the I/O access request is the second-type data, the virtual machine accesses the second-type data in the storage space of the I/O device.

For example, with reference to S1043, the virtual machine monitor directly stores the second-type data in the storage space of the I/O device. In this case, in the data access process, when identifying that the type of the hardware data in the I/O access request is the second-type data, the virtual machine may directly access the data in the storage space of the I/O device. Because there is the mapping relationship between the first virtual address space and the address of the second memory space and there is the mapping relationship between the address of the second memory space and the address of the storage space of the I/O device, when accessing the first virtual address space, the virtual machine may directly access the second-type data in the storage space of the I/O device. This ensures timeliness of accessing the second-type data.

It can be learned from the foregoing description that, in the data access process in this embodiment of this application, if the type of the hardware data that the I/O access request accesses is the first-type data, the virtual machine reads the data from the first memory space of the server. If the type of the hardware data that the I/O access request accesses is the second-type data, the virtual machine reads the data from the storage space of the I/O device. In comparison with an existing manner in which data is accessed all in the storage space of the I/O device, the method reduces a quantity of times that the I/O device is accessed, and further improves a data access speed.

According to the data processing method provided in this embodiment of this application, in the data storage process, the virtual machine monitor stores, in first memory space of the server, the first-type data in the hardware data of the virtual I/O device. In comparison with an existing manner in which all hardware data of the virtual I/O device is stored in the storage space of the I/O device, when the I/O device includes a large quantity of virtual I/O devices, the method according to this embodiment of this application can greatly reduce occupation of the storage space of the I/O device and overheads of hardware of the I/O device. In the data access process, after receiving the I/O access request, the virtual machine identifies the type of the hardware data that the I/O access request requests to access. When identifying that the type of the hardware data that the I/O access request requests to access is the first-type data, the virtual machine accesses the data in the first memory space of the server. When identifying that the type of the hardware data that the I/O access request requests to access is the second-type data, the virtual machine accesses the data in the storage space of the I/O device. This reduces the quantity of times that the I/O device is accessed, and further improves the data access speed.

Figure 6:
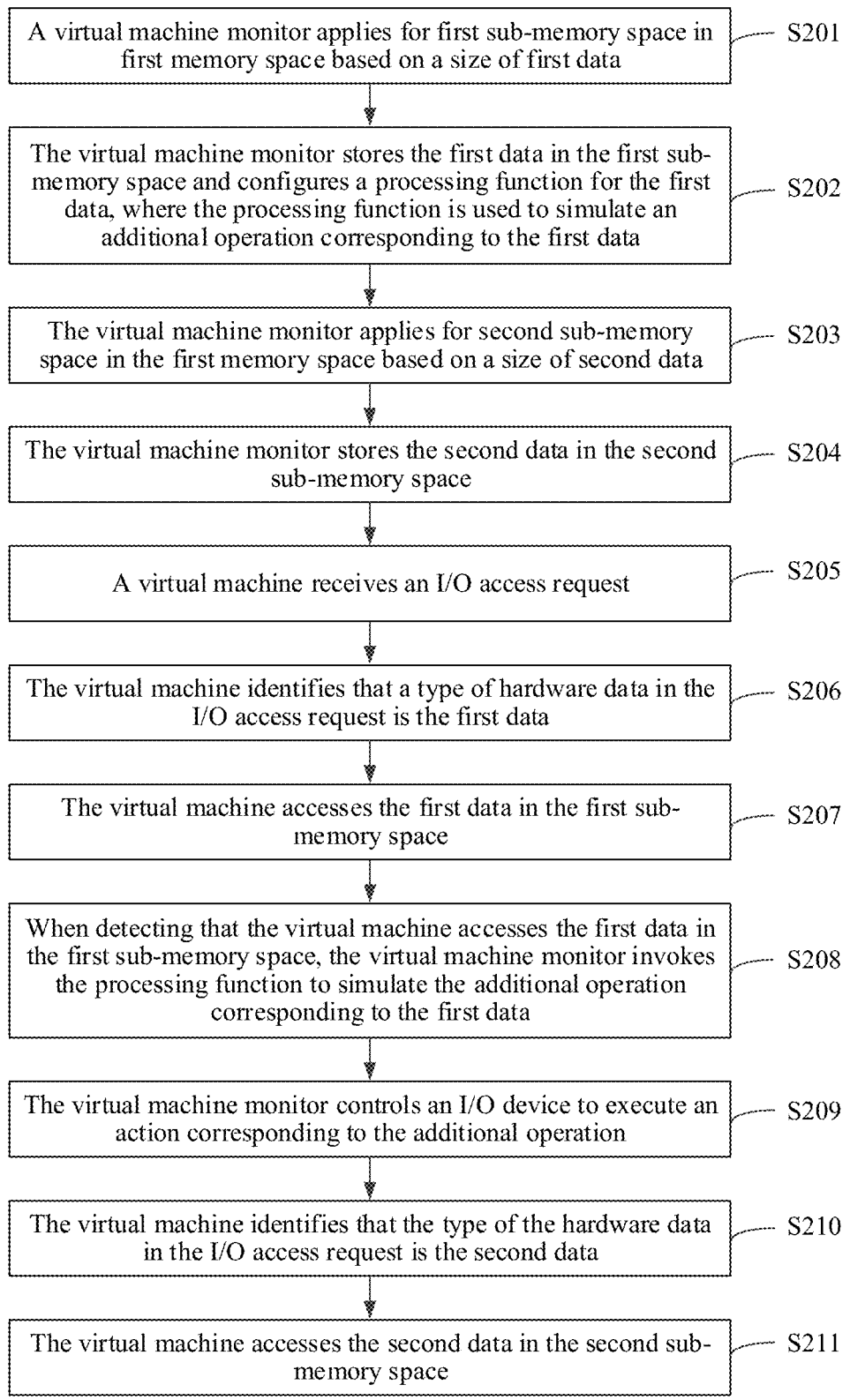
FIG. 6 is another flowchart of a data processing method according to an embodiment of this application.

FIG. 4 describes in detail the process of storing the first-type data and the second data by the virtual machine monitor, and the process of accessing the first-type data and the second-type data by the virtual machine. FIG. 6 is another flowchart of a data processing method according to an embodiment of this application. The following describes in detail processes of storing and accessing first data and second data in first-type data in this embodiment of this application. Referring to FIG. 1, FIG. 5, and FIG. 6, the method in this embodiment of this application may include the following steps.

S201: A virtual machine monitor applies for first sub-memory space in first memory space based on a size of the first data.

S202: The virtual machine monitor stores the first data in the first sub-memory space and configures a processing function for the first data, where the processing function is used to simulate an additional operation corresponding to the first data.

In this application, the first-type data is divided into the first data and the second data. A division manner of the first data and the second data is not limited in this application, and is determined based on an actual requirement.

In an optional manner, the first-type data is divided into the first data and the second data based on whether the additional operation, such as reset or queue enabling, of an I/O device is caused when a virtual machine accesses the first-type data. The first data is hardware data that causes the additional operation of the I/O device when the virtual machine accesses the first data, and the second data is data other than the first data in the first-type data, that is, the second data is hardware data that does not cause the additional operation of the I/O device when the virtual machine accesses the second data.

When storing the first data, the virtual machine monitor applies for the first sub-memory space that is used to store the first data and that is from the first memory space of the server based on the size of the first data, and stores the first data in the first sub-memory space, to reduce load of hardware on the I/O device.

For example, when being accessed by the virtual machine, some data defined by common configuration capability space in the Virtio protocol may generate the additional operation. For example, a device_status field is used to synchronize status information between a front-end driver and the I/O device. When the device_status field is cleared by the virtual machine, the I/O device is reset, and the I/O device clears previous configuration information or restores to a default value. For another example, that a queue_enable field is set indicates that the virtual machine has allocated necessary shared memory to a queue, and the I/O device needs to record a queue address and prepare for data transmission initiated by the queue at any time. The virtual machine monitor applies for corresponding first sub-memory space for the fields.

When the virtual machine accesses the first data, the additional operation of the I/O device is caused. For example, the first data is reset data, and when the virtual machine accesses the reset data, a reset operation of the I/O device is caused.

In this embodiment of this application, because the virtual machine monitor configures the first data in the first memory space of the server through simulation, when the virtual machine monitor accesses the first data, the I/O device cannot directly generate the additional operation. Therefore, in this embodiment of this application, the processing function is configured for the first data, where the processing function is used to simulate the additional operation corresponding to the first data.

It should be noted that the foregoing processing function is a software program, and may be executed by a processor in the server. In the subsequent data access process, when the virtual machine accesses the first sub-memory space, the virtual machine monitor invokes the processing function to simulate the additional operation corresponding to the first data. Then, the I/O device is driven to complete an action corresponding to the additional operation, for example, a reset action.

S203: The virtual machine monitor applies for second sub-memory space in the first memory space based on a size of the second data.

S204: The virtual machine monitor stores the second data in the second sub-memory space.

The Virtio protocol is used as an example. Device-specific capability space is used to describe a specific attribute of a device, for example, device-related attribute data such as a Virtio Net network interface card, a MAC address, a maximum quantity of queues supported by a virtual I/O device, and a quantity of queues. The data is usually implemented by using a static random access memory (SRAM)/register, and the data does not relate to the I/O process. In addition, the attribute data is synchronized between a front end and a back end only once in an initialization phase of the front-end driver of the virtual machine, and is subsequently fixed as a basic attribute of the front-end driver for a service to use. The attribute data is no longer accessed in a process of the I/O device, and is recorded as the second data. The virtual machine monitor applies for the second sub-memory space in the first memory space of the server for the second data, and stores the second data in the second sub-memory space, to reduce load of hardware on the I/O device.

Figure 7:
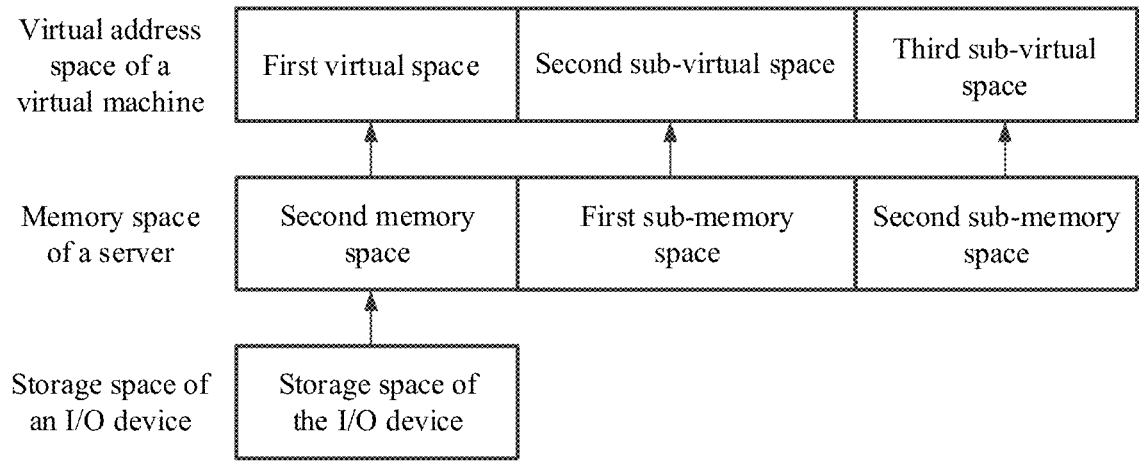
FIG. 7 is a schematic diagram of memory allocation according to an embodiment of this application.

It should be noted that, FIG. 7 shows, as an example, that addresses of second memory space, the first sub-memory space, and the second sub-memory space are connected. However, this embodiment of this application is not limited to FIG. 7. In other words, the addresses of the second memory space, the first sub-memory space, and the second sub-memory space may be connected, or may not be connected. This is not limited in this embodiment of this application.

In a possible embodiment, to help the virtual machine access hardware data of the virtual I/O device, in the data storage process in this embodiment of this application, the method further includes the following steps.

S2041: The virtual machine monitor maps an address of second-type data in storage space of the I/O device to the address of the second memory space of the server.

S2042: The virtual machine monitor maps the address of the second memory space, the address of the first sub-memory space, and the address of the second sub-memory space to virtual address space of the virtual machine.

As shown in FIG. 7, it is assumed that the virtual address space of the virtual machine is divided into three parts, and the three parts are denoted as first virtual address space, second sub-virtual address space, and third sub-virtual address space. The second sub-virtual address space and third sub-virtual address space belong to second virtual address space. The virtual machine monitor maps the address of the second memory space to the first virtual address space of the virtual machine, maps the address of the first sub-memory space to the second sub-virtual address space of the virtual machine, and maps the address of the second sub-memory space to the third sub-virtual address space of the virtual machine.

In this case, in the data access process, because of a mapping relationship between the address of the first sub-memory space and the second sub-virtual address space, a mapping relationship between the address of the second sub-memory space and the third sub-virtual address space, and a mapping relationship between the address of the second memory space and the first virtual address space, when the virtual machine directly accesses the virtual address space that can be accessed, the virtual machine can directly access the data.

For example, when accessing the second data, the virtual machine accesses the third sub-virtual address space. Because there is the mapping relationship between the third sub-virtual address space and the address of the second sub-memory space, the virtual machine may directly access the second data in the second sub-memory space.

For another example, when accessing the first data, the virtual machine accesses the second sub-virtual address space. Because there is the mapping relationship between the second virtual address space and the address of the first sub-memory space of the server, the virtual machine may directly access the first data in the first sub-memory space. In addition, when the virtual machine monitor detects that the virtual machine accesses the first data in the first sub-memory space, the virtual machine monitor intercepts the I/O access request. The virtual machine monitor invokes the processing function corresponding to the first data, to simulate the additional operation corresponding to the first data, and control the I/O device to execute the action corresponding to the additional operation.

In this embodiment of this application, the first-type data is divided into the first data and the second data based on whether the additional operation of the I/O device is caused when the virtual machine accesses the first-type data, the first data and the second data are stored in two sub-memory space in the first memory space, that is, the first data is stored in the first sub-memory space, and the second data is stored in the second sub-memory space, and the additional operation corresponding to the first data is stored in the first sub-memory space. This helps the virtual machine access the first data and the second data subsequently, and ensures authenticity of accessing the first data by the virtual machine.

Based on the foregoing steps S201 to S204, the first data and the second data are stored. S205 to S211 are an access process in which the virtual machine accesses the first data, and S210 to S211 are an access process in which the virtual machine accesses the second data.

S205: The virtual machine receives the I/O access request.

For an implementation of process S205, refer to the description in S105. Details are not described herein again.

S206: The virtual machine identifies that the type of the hardware data in the I/O access request is the first data.

S207: The virtual machine accesses the first data in the first sub-memory space.

After receiving the I/O access request, the virtual machine identifies the type of the hardware data included in the I/O access request. For example, the virtual machine may identify that the type of the hardware data included in the I/O access request is the first data in the first-type data, and the virtual machine accesses the first data in the first sub-memory space.

S208: When detecting that the virtual machine accesses the first data in the first sub-memory space, the virtual machine monitor invokes the processing function to simulate the additional operation corresponding to the first data.

S209: The virtual machine monitor controls the I/O device to execute the action corresponding to the additional operation.

When detecting that the virtual machine accesses the first data in the first sub-memory space, the virtual machine monitor intercepts the I/O access request, and invokes the processing function corresponding to the first data to simulate the additional operation corresponding to the first data. Then, the virtual machine monitor controls, based on the additional operation of simulation, the I/O device to execute the action corresponding to the additional operation, for example, the reset action. The processing function is essentially a combination of a group of program code, and is used to simulate a data processing process, so that the I/O device implements an actual action.

For example, the first data is reset data. When the virtual machine receives the I/O access request, the front-end driver of the virtual machine generates a signal, for example, a VM exit signal. The virtual machine monitor intercepts the I/O access request, invokes the processing function to simulate the reset operation, and controls an actual reset operation of the I/O device.

S210: The virtual machine identifies that the type of the hardware data in the I/O access request is the second data.

S211: The virtual machine accesses the second data in the second sub-memory space.

After receiving the I/O access request, the virtual machine identifies that the type of the hardware data included in the I/O access request is the second data in the first-type data, and accesses the second data in the second sub-memory space.

According to the method in this embodiment of this application, the virtual machine monitor divides the first-type data into the first data and the second data, applies for the first sub-memory space in the first memory space for the first data, stores the first data in the first sub-memory space, and configures the processing function for the first data. The virtual machine monitor applies for the second sub-memory space in the first memory space for the second data, and stores the second data in the second sub-memory space. When the virtual machine accesses the first data, the virtual machine monitor intercepts the I/O access request, invokes the processing function to simulate the additional operation corresponding to the first data, and controls the I/O device to complete the action corresponding to the additional operation, so as to implement effective access to the first data. In addition, in this embodiment of this application, the virtual machine directly accesses the first data and the second data in the memory space of the server instead of accessing the first data and the second data in the storage space of the I/O device. This reduces a quantity of times the I/O device is operated, and reduces overheads of hardware of the I/O device.

In a conventional technology, storage space of an I/O device is configured for a virtual I/O device. The storage space of the I/O device corresponds to I/O storage space. Data in the I/O storage space is fixed and cannot be changed. When a protocol of the virtual I/O device is updated, and a new functional area is added or a vendor-specific register is added, the conventional technology cannot meet a technical requirement.

To resolve the technical problem, based on S201 to S205, the method according to this embodiment of this application includes the following step.

S200: When detecting that the second data changes, the virtual machine monitor sends changed second data to the I/O device.

In this embodiment of this application, the second data is stored in the second sub-memory space of the server, and the second data in the second sub-memory space may be changed or added. In this case, when the protocol of the virtual I/O device is updated, and a new functional area or a vendor-specific register is added, a problem that it is inconvenient to add new data is resolved by changing or adding the second data in the second sub-memory space.

When detecting that the second data in the second sub-memory space is changed, the virtual machine monitor sends changed second data to the I/O device in time, to ensure that a driver of the virtual machine works together with the I/O device normally.

In a possible embodiment of S200, the virtual machine monitor defines a plurality of trigger events. The trigger event may be understood as an event that causes changing of the second data, for example, changing a MAC address of the I/O device, assigning a new functional area to the I/O device, or queue enabling. When the trigger event occurs, the virtual machine monitor stores the changed second data in the second sub-memory space, intercepts the trigger event, obtains the changed second data from the second sub-memory space based on the trigger event, and sends the changed second data to the I/O device. The I/O device writes the changed second data into the storage space of the I/O device, for example, writing the changed second data into a management buffer of the I/O device.

For example, in the Virtio protocol, the front-end driver of the virtual machine allocates necessary shared memory to the queue, and fills a memory address in queue_desc, queue_avail, and queue_used fields defined by the common configuration capability space. Information needs to be obtained and recorded by the I/O device in time, so that when the I/O access request is initiated, the I/O device can use the information and a DMA engine to transfer data from a corresponding address of the server.

For example, in this embodiment of this application, the virtual machine monitor defines queue enabling as a trigger event, and the front-end driver of the virtual machine fills in queue information. The front-end driver of the virtual machine enables a queue_enable field. The virtual machine monitor intercepts the trigger event, simulates the trigger event, and configures the queue information queue_desc, queue_avail, and queue_used in the second sub-memory space of the server. In addition, the virtual machine monitor obtains the queue information queue_desc, queue_avail, and queue_used from the second sub-memory space, and transfers the information to the I/O device in a form of ioctl, so that the I/O device writes the information into the storage space of the I/O device, and completes queue information synchronization with reference to internal logic of the I/O device.

In this step, when a new functional area is added or a vendor-specific register needs to be added subsequently because the protocol is updated, causing changing of the second data, the virtual machine monitor may obtain changed second data, and sends the changed second data to the I/O device. This ensures synchronization between software information and hardware information of the I/O device, and further resolves the problem that it is inconvenient to add new data.

According to the method in this embodiment of this application, the virtual machine monitor applies for the second sub-memory space in the first memory space of the server for the second data, and stores the second data in the second sub-memory space, where the second data in the second sub-memory space may be changed or added. In this case, when the protocol of the virtual I/O device is updated, and a new functional area or a vendor-specific register is added, the problem that it is inconvenient to add new data is resolved by changing or adding the second data in the second sub-memory space. When detecting that the second data in the second sub-memory space is changed, the virtual machine monitor sends changed second data to the I/O device, to ensure that the driver of the virtual machine works together with the I/O device normally.

The foregoing describes in detail the data processing method provided in the embodiments of this application with reference to FIG. 1 to FIG. 7. The following describes a data processing apparatus and device provided in the embodiments of this application with reference to FIG. 8 and FIG. 10.

Figure 8:
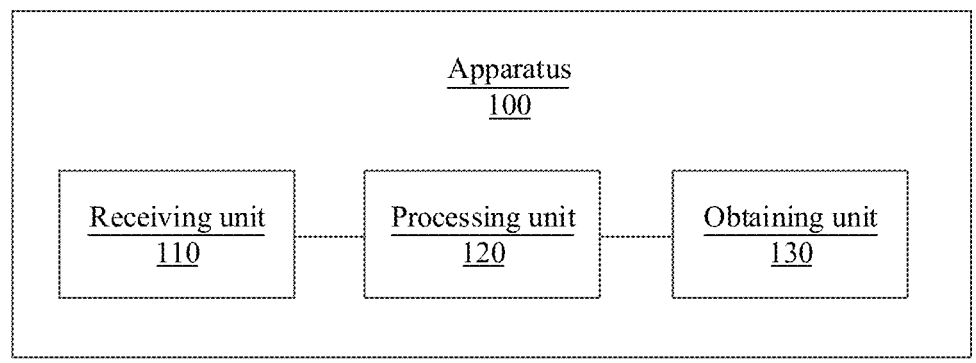
FIG. 8 is a schematic structural diagram of an apparatus according to an embodiment of this application.

FIG. 8 is a schematic structural diagram of a data processing apparatus according to an embodiment of this application. The apparatus 100 is configured to perform the method performed by the virtual machine in the foregoing method embodiments. The apparatus 100 is applied to a data processing system. The data processing system includes the apparatus 100 and an input/output I/O device. As shown in FIG. 8, the apparatus 100 includes a receiving unit 110, a processing unit 120, and an obtaining unit 130.

The receiving unit 110 is configured to receive an I/O access request, where the I/O access request is used to access data, the I/O access request includes a type of hardware data used to indicate a working status of a virtual I/O device, and the virtual I/O device is obtained after the I/O device is virtualized.

The processing unit 120 is configured to identify that the type of the hardware data in the I/O access request is first-type data, where the first-type data is hardware data, of the virtual I/O device, that remains unchanged in a data processing process.

The obtaining unit 130 is configured to obtain to-be-accessed data from first memory space, where the first memory space is memory storage space in the data processing system.

The apparatus 100 according to this embodiment of this application may be configured to perform the operation steps performed by the virtual machine in the foregoing method embodiments. Implementation principles and technical effects of the apparatus 100 are similar to those in the method embodiments. Details are not described herein again.

Optionally, the first-type data includes first data, the first data is hardware data that causes an additional operation of the I/O device when the apparatus 100 accesses the first data, the first memory space includes first sub-memory space, the first sub-memory space stores the first data and a processing function, and the processing function is used to simulate the additional operation corresponding to the first data.

The obtaining unit 130 is configured to obtain the first data from the first sub-memory space, and enable a virtual machine monitor to invoke the processing function to simulate the additional operation corresponding to the first data, to control the I/O device to execute an action corresponding to the additional operation, where the data processing system includes the virtual machine monitor.

Optionally, the first-type data further includes second data, the second data is hardware data other than the first data in the first-type data, the first memory space further includes second sub-memory space, and the second data is stored in the second sub-memory space.

The obtaining unit 130 is configured to access the second data in the second sub-memory space.

Optionally, there is a mapping relationship between a virtual address of the apparatus 100 and an address of the first memory space.

It should be understood that the apparatus 100 in this embodiment of this application may be implemented through an application-specific integrated circuit (ASIC), or may be implemented through a programmable logic device (PLD). The PLD may be a complex programmable logic device (CPLD), a field-programmable gate array (FPGA), generic array logic (GAL), or any combination thereof. Alternatively, when the data processing method shown in FIG. 4 and FIG. 6 is implemented by software, the apparatus 100 and modules of the apparatus 100 may be software modules.

The apparatus 100 according to this embodiment of this application is configured to perform the corresponding method in the embodiments of this application. In addition, the foregoing and other operations and/or functions of the units in the apparatus 100 are separately configured to implement the corresponding procedures of the methods performed by the virtual machine in FIG. 4 and FIG. 6. For brevity, details are not described herein again.

Figure 9:
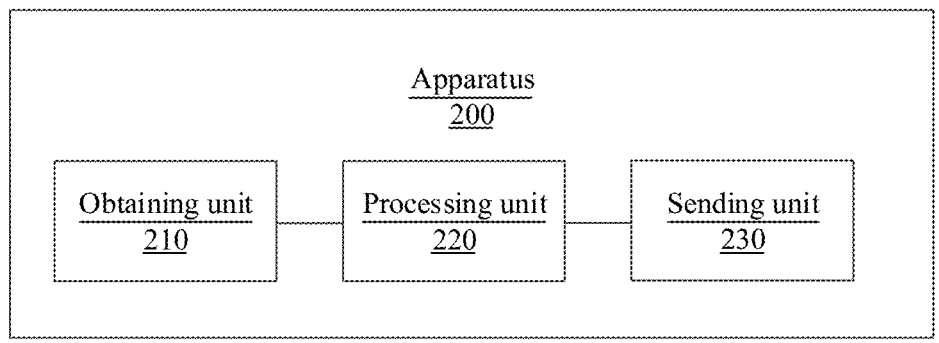
FIG. 9 is a schematic structural diagram of another apparatus according to an embodiment of this application.

FIG. 9 is a schematic structural diagram of a data processing apparatus 200 according to an embodiment of this application. The apparatus 200 may be understood as software code in a processor in a data processing system, and the apparatus 200 is configured to perform the method performed by the virtual machine monitor in the foregoing method embodiments. The apparatus 200 is applied to the data processing system. The data processing system includes the apparatus 200, a virtual machine, and an input/output I/O device. As shown in FIG. 9, the apparatus 200 includes an obtaining unit 210 and a processing unit 220.

The obtaining unit 210 is configured to obtain first-type data, where the first-type data is hardware data, of a virtual I/O device, that remains unchanged in a data processing process, and the virtual I/O device is obtained after the I/O device is virtualized.

The processing unit 220 is configured to store the first-type data in first memory space, where the first memory space is memory storage space in the data processing system.

The apparatus 200 according to this embodiment of this application may be configured to execute the technical solution executed by the virtual machine monitor in the foregoing method embodiments. Implementation principles and technical effects of the apparatus 200 are similar to those in the method embodiments. Details are not described herein again.

Optionally, the processing unit 220 is further configured to apply for the first memory space in memory storage space in the data processing system based on a size of the first-type data.

Optionally, the first-type data includes first data, and the first data is hardware data that causes an additional operation of the I/O device when the virtual machine accesses the first data.

The processing unit 220 is configured to apply for first sub-memory space in the first memory space based on a size of the first data, and store the first data and a processing function in the first sub-memory space, where the processing function is used to simulate the additional operation corresponding to the first data.

Optionally, the processing unit 220 is further configured to: when detecting that the virtual machine accesses the first data in the first sub-memory space, invoke the processing function to simulate the additional operation corresponding to the first data, and control the I/O device to execute an action corresponding to the additional operation.

Optionally, the first-type data further includes second data, and the second data is hardware data other than the first data in the first-type data.

The processing unit 220 is configured to apply for second sub-memory space in the first memory space based on a size of the second data, and store the second data in the second sub-memory space.

Optionally, the apparatus 200 further includes a sending unit 230.

The processing unit 220 is further configured to detect that the second data changes.

The sending unit 230 is configured to: when the processing unit 220 detects that the second data changes, send changed second data to the I/O device.

Optionally, the processing unit 220 is further configured to store second-type data in storage space of the I/O device, where the second-type data is hardware data other than the first-type data in the hardware data of the virtual I/O device.

Optionally, the processing unit 220 is further configured to map an address of the second-type data in the storage space of the I/O device to an address of second memory space.

Optionally, the processing unit 220 is further configured to map both an address of the first memory space and the address of the second memory space to virtual address space of the virtual machine.

It should be understood that the apparatus 200 in this embodiment of this application may be implemented through an application-specific integrated circuit (ASIC), or may be implemented through a programmable logic device (PLD). The PLD may be a complex programmable logic device (CPLD), a field-programmable gate array (FPGA), generic array logic (GAL), or any combination thereof. Alternatively, when the data processing method shown in FIG. 4 and FIG. 6 is implemented by software, the apparatus 200 and modules of the apparatus 200 may be software modules.

The apparatus 200 according to this embodiment of this application is configured to perform the corresponding method in the embodiments of this application. In addition, the foregoing and other operations and/or functions of the units in the apparatus 200 are separately configured to implement the corresponding procedures of the methods performed by the virtual machine monitor in FIG. 4 and FIG. 6. For brevity, details are not described herein again.

Figure 10:
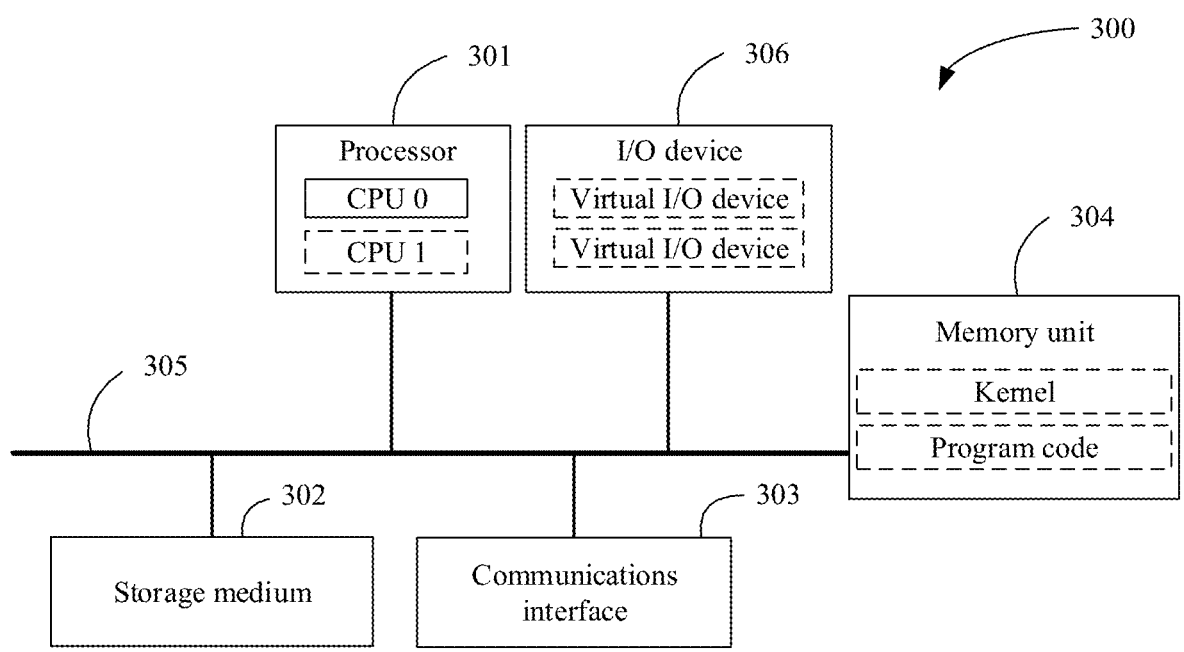
FIG. 10 is a schematic structural diagram of a data processing device according to an embodiment of this application.

FIG. 10 is a schematic structural diagram of a data processing device according to an embodiment of this application. As shown in FIG. 10, a device 300 includes a processor 301, and the processor 301 is connected to one or more data storage devices. The data storage device may include a storage medium 306 and a memory unit 304. The storage medium 306 may be read-only, for example, a read-only memory (ROM), or may be readable/writable, for example, a hard disk or a flash storage. The memory unit 304 may be a random access memory (RAM). The memory unit 304 may be physically integrated into the processor 301, or may be constructed in an independent unit or a unit.

The processor 301 is a control center of the device 300, and provides sequencing and processing facilities to execute an instruction, execute an interrupt action, and provide a timing function and another function. Optionally, the processor 301 includes one or more central processing units (CPU), for example, a CPU 0 and a CPU 1 shown in FIG. 10. Optionally, the device 300 includes a plurality of processors. The processor 301 may be a single-core (single-CPU) processor, or may be a multi-core (multi-CPU) processor. Unless otherwise specified, a component such as a processor or a memory configured to perform a task may be implemented as a temporarily configured general component configured to perform the task at a given time or a specific component configured to perform the task. The term "processor" used in this specification refers to one or more devices or circuits. The processor 301 may alternatively be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor or any conventional processor or the like.

Program code executed by the CPU in the processor 301 may be stored in the memory unit 304 or the storage medium 302. Optionally, the program code (for example, a kernel and a to-be-debugged program) is stored in the storage medium 302, and is copied into the memory unit 304 for execution by the processor 301. The processor 301 may execute at least one kernel (for example, the kernel is a kernel in an operating system such as LINUX™, UNIX™, WINDOWS™, ANDROID™ or IOS™). The processor 301 controls execution of another program or process, controls communication with a peripheral device, and controls usage of a resource of the data processing device, to control running of the device 300.

The data processing device 300 further includes a communications interface 303 configured to communicate with another device or system directly or through an external network. Optionally, the device 300 further includes an output device and an input device (not shown in FIG. 10). The output device is connected to the processor 301, and may display information in one or more manners. For example, the output device is a visual display device such as a liquid crystal display (LCD), a light-emitting diode (LED) display, a cathode-ray tube (CRT), or a projector. The input device is further connected to the processor 301, and may receive user input from the device 300 or another device. For example, the input device includes a mouse, a keyboard, a touchscreen device, a sensor, or the like.

The foregoing elements of the data processing device 300 may be connected by using a bus, for example, any one or any combination of a data bus, an address bus, a control bus, an expansion bus, and a local bus.

Optionally, the data processing device 300 may further include the I/O device in the foregoing embodiment. The I/O device includes one or more virtual I/O devices, and the I/O device is in a communication connection to the processor. The virtual I/O device and a virtual machine are in a one-to-one correspondence, and the virtual I/O device is used by the virtual machine to access the I/O device.

Optionally, the data processing device 300 is configured to implement an operation corresponding to the virtual machine in the foregoing embodiments. For example, the processor 301 may receive an I/O access request, where the I/O access request is used to access data, the I/O access request includes a type of hardware data used to indicate a working status of the virtual I/O device, and the virtual I/O device is obtained after the I/O device is virtualized; identify that the type of the hardware data in the I/O access request is first-type data; and obtain to-be-accessed data from first memory space, where the first memory space is memory storage space in the data processing system.

For an implementation of the processor 301, refer to related descriptions of the virtual machine in the foregoing embodiments. Details are not described herein again.

Optionally, the data processing device 300 is configured to implement an operation corresponding to the virtual machine in the foregoing embodiments. For example, the processor 301 may obtain first-type data, where the first-type data is hardware data, of the virtual I/O device, that remains unchanged in a data processing process, and the virtual I/O device is obtained after the I/O device is virtualized; and store the first-type data in first memory space, where the first memory space is memory storage space in the data processing system.

For an implementation process of the processor 301, refer to related descriptions of the virtual machine monitor in the foregoing embodiments. Details are not described herein again.

The data processing device 300 in this embodiment may be the data processing system (or a component that can be used in the data processing system) mentioned in the foregoing method embodiments. The data processing device 300 may be configured to implement the method corresponding to the virtual machine or the virtual machine monitor described in the foregoing method embodiments. For details, refer to descriptions in the foregoing method embodiments.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person skilled in the art may clearly understand that, for the purpose of convenient and brief description, for detailed working processes of the foregoing system, apparatus, and unit, refer to corresponding processes in the foregoing method embodiments. Details are not described herein again. In addition, mutual reference may also be made between the method embodiments and between the apparatus embodiments, and same or corresponding content in different embodiments may be cross-referenced. Details are not described herein again.

What is claimed is:

1. A data processing method, wherein the method is applied to a data processing system, the data processing system comprises a virtual machine and an input/output (I/O) device, and the method comprises:
   receiving, by the virtual machine, an I/O access request, wherein the I/O access request is used to access data, the I/O access request comprises a type of hardware data used to indicate a working status of a virtual I/O device, and the virtual I/O device is obtained after the I/O device is virtualized;
   identifying, by the virtual machine, that the type of the hardware data in the I/O access request is first-type data, wherein the first-type data is hardware data of the virtual I/O device that remains unchanged in a data processing process; and
   obtaining, by the virtual machine, to-be-accessed data from a first memory space, wherein the first memory space is memory storage space in the data processing system,
   wherein the first-type data comprises first data, the first data is hardware data that causes an additional operation of the I/O device based on a determination that the virtual machine accesses the first data, the first memory space comprises a first sub-memory space, the first sub-memory space stores the first data and a processing function, and the processing function is used to simulate the additional operation corresponding to the first data.

2. The method according to claim 1, wherein the obtaining, by the virtual machine, to-be-accessed data from the first memory space comprises:
   obtaining, by the virtual machine, the first data from the first sub-memory space; and
   enabling a virtual machine monitor to invoke the processing function to simulate the additional operation corresponding to the first data to control the I/O device to execute an action corresponding to the additional operation, wherein the data processing system comprises the virtual machine monitor.

3. The method according to claim 2, wherein the first-type data further comprises second data, the second data is hardware data other than the first data in the first-type data, the first memory space further comprises a second sub-memory space, and the second data is stored in the second sub-memory space, and
   the obtaining, by the virtual machine, to-be-accessed data from the first memory space comprises:
   accessing, by the virtual machine, the second data in the second sub-memory space.

4. The method according to claim 1, wherein there is a mapping relationship between a virtual address of the virtual machine and an address of the first memory space.

5. A data processing method, applied to a data processing system, wherein the data processing system comprises a virtual machine monitor, a virtual machine, and an input/output I/O device, and the method comprises:
   obtaining, by the virtual machine monitor, first-type data, wherein the first-type data is hardware data of a virtual I/O device that remains unchanged in a data processing process, and the virtual I/O device is an I/O device obtained after the I/O device is virtualized;
   applying, by the virtual machine monitor, for a first memory space in a memory storage space in the data processing system based on a size of the first-type data; and
   storing, by the virtual machine monitor, the first-type data in the first memory space.

6. The method according to claim 5, wherein the applying, by the virtual machine monitor, for the first memory space in the memory storage space in the data processing system based on the size of the first-type data is before the storing, by the virtual machine monitor, of the first-type data in the first memory space.

7. The method according to claim 6, wherein the first-type data comprises first data, the first data is hardware data that causes an additional operation of the I/O device based on a determination that the virtual machine accesses the first data, and the method further comprises:
   applying, by the virtual machine monitor, for a first sub-memory space in the first memory space based on a size of the first data; and storing, by the virtual machine monitor, the first data and a processing function in the first sub-memory space, wherein the processing function is used to simulate the additional operation corresponding to the first data.

8. The method according to claim 7, wherein the method further comprises:
based on the determination that the virtual machine accesses the first data in the first sub-memory space, invoking, by the virtual machine monitor, the processing function to simulate the additional operation corresponding to the first data; and
controlling, by the virtual machine monitor, the I/O device to execute an action corresponding to the additional operation.

9. A data processing system, comprising a virtual machine monitor, a virtual machine, and an input/output I/O device, wherein
the virtual machine is configured to:
receive an I/O access request, wherein the I/O access request is used to access data, the I/O access request comprises a type of hardware data used to indicate a working status of a virtual I/O device, and the virtual I/O device is obtained after the I/O device is virtualized;
identify that the type of the hardware data in the I/O access request is first-type data, wherein the first-type data is hardware data of the virtual I/O device that remains unchanged in a data processing process; and
obtain to-be-accessed data from a first memory space, wherein
the first memory space is memory storage space in the data processing system, and the virtual machine monitor is configured to:
obtain the first-type data; and
store the first-type data in the first memory space, and
the first-type data comprises first data, the first data is hardware data that causes an additional operation of the I/O device based on a determination that the virtual machine accesses the first data, the first memory space comprises a first sub-memory space, the first sub-memory space stores the first data and a processing function, and the processing function is used to simulate the additional operation corresponding to the first data.

10. The system according to claim 9, wherein the virtual machine is further configured to obtain the first data from the first sub-memory space, and enable the virtual machine monitor to invoke the processing function to simulate the additional operation corresponding to the first data to control the I/O device to execute an action corresponding to the additional operation.

11. The system according to claim 10, wherein the first-type data further comprises second data, the second data is hardware data other than the first data in the first-type data, the first memory space further comprises a second sub-memory space, and the second data is stored in the second sub-memory space; and
the virtual machine is further configured to access the second data in the second sub-memory space.

12. The system according to claim 9, wherein there is a mapping relationship between a virtual address of the data processing system and an address of the first memory space.

13. The system according to claim 9, wherein
the virtual machine monitor is further configured to apply for the first memory space in the memory storage space in the data processing system based on a size of the first-type data.

14. The system according to claim 13, wherein
the first-type data comprises the first data, and the first data is hardware data that causes an additional operation of the I/O device based on a determination that the virtual machine accesses the first data, and
the virtual machine monitor is configured to apply for a first sub-memory space in the first memory space based on a size of the first data, and store the first data and the processing function in the first sub-memory space.

15. The system according to claim 13, wherein
the virtual machine monitor is further configured to:
based on the determination that the virtual machine accesses the first data in the first sub-memory space, invoke the processing function to simulate the additional operation corresponding to the first data; and
control the I/O device to execute an action corresponding to the additional operation.

16. The system according to claim 9, wherein
the virtual machine monitor is further configured to:
simulate the additional operation corresponding to the first data to control the I/O device to execute an action corresponding to the additional operation.

17. The method according to claim 1, further comprising:
simulating the additional operation corresponding to the first data to control the I/O device to execute an action corresponding to the additional operation.

18. The method according to claim 1, further comprising:
applying, by a virtual machine monitor included in the data processing system, for a first memory space in a memory storage space in the data processing system based on a size of the first-type data.

19. The method according to claim 5, wherein the first-type data comprises first data, the first data is hardware data that causes an additional operation of the I/O device based on a determination that the virtual machine accesses the first data, and the method further comprises:
applying, by the virtual machine monitor, for a first sub-memory space in the first memory space based on a size of the first data; and
storing, by the virtual machine monitor, the first data and a processing function in the first sub-memory space, wherein the processing function is used to simulate the additional operation corresponding to the first data.

20. The method according to claim 5, wherein the first-type data comprises first data, the first data is hardware data that causes an additional operation of the I/O device based on a determination that the virtual machine accesses the first data, the first memory space comprises a first sub-memory space, the first sub-memory space stores the first data and a processing function, and the processing function is used to simulate the additional operation corresponding to the first data, and the method further comprises:
simulating the additional operation corresponding to the first data to control the I/O device to execute an action corresponding to the additional operation.

* * * * *